US008952296B2

(12) United States Patent
Hermann et al.

(10) Patent No.: US 8,952,296 B2
(45) Date of Patent: Feb. 10, 2015

(54) INTERIOR LINING

(75) Inventors: Volker Hermann, Würzburg (DE); Michael Ewert, Leonberg (DE)

(73) Assignee: NBHX Trim GmbH, Hellsbronn (DE)

( * ) Notice: Subject to any disclaimer, the term of this patent is extended or adjusted under 35 U.S.C. 154(b) by 180 days.

(21) Appl. No.: 13/504,779

(22) PCT Filed: Nov. 10, 2010

(86) PCT No.: PCT/EP2010/067242
§ 371 (c)(1),
(2), (4) Date: Apr. 27, 2012

(87) PCT Pub. No.: WO2011/058077
PCT Pub. Date: May 19, 2011

(65) Prior Publication Data
US 2012/0217232 A1    Aug. 30, 2012

(30) Foreign Application Priority Data
Nov. 11, 2009   (DE) .................. 10 2009 052 535

(51) Int. Cl.
| | |
|---|---|
| *B60H 1/22* | (2006.01) |
| *H05B 3/28* | (2006.01) |
| *B60H 1/00* | (2006.01) |
| *B64C 1/40* | (2006.01) |
| *B60R 13/02* | (2006.01) |

(52) U.S. Cl.
CPC .......... *B60H 1/2215* (2013.01); *B60H 1/00271* (2013.01); *B60H 2001/2287* (2013.01); *B64C 1/40* (2013.01); *B60R 13/02* (2013.01); *B60R 2013/0287* (2013.01)

USPC .......... 219/202; 219/535; 219/544; 219/545; 219/548; 392/435

(58) Field of Classification Search
CPC .......... H05B 3/28; H05B 3/283; H05B 3/286; H05B 2203/003; H05B 2203/004; H05B 2203/032; H05B 2001/00128; H05B 2001/00221; B60H 1/00271
See application file for complete search history.

(56) References Cited

U.S. PATENT DOCUMENTS

| | | | | |
|---|---|---|---|---|
| 2,519,109 | A * | 8/1950 | Callender | 236/91 R |
| 2,540,295 | A * | 2/1951 | Schreiber | 219/213 |
| 3,697,728 | A * | 10/1972 | Stirzenbecher | 219/548 |
| 4,294,003 | A * | 10/1981 | Coverstone | 29/611 |
| 4,471,212 | A * | 9/1984 | Hager, Jr. | 392/435 |
| 4,659,906 | A * | 4/1987 | Furtek | 392/435 |
| 5,029,231 | A * | 7/1991 | Carr et al. | 392/435 |
| 5,605,642 | A * | 2/1997 | Nece | 219/202 |

(Continued)

*Primary Examiner* — Joseph M Pelham
(74) *Attorney, Agent, or Firm* — Miller, Matthias & Hull LLP

(57) ABSTRACT

The invention relates to an interior lining for vehicles and aircraft having a carrier and a heating layer and an upper layer, wherein the at least one heating layer is arranged between the carrier and the upper layer, and the heating layer and the upper layer are directly or indirectly interconnected, and to a method for producing such an interior lining, wherein at least one heating layer is pre-laminated onto an upper layer to form a layer composite, and the layer composite is press-laminated, membrane-laminated or vacuum-laminated onto a carrier, or alternatively, in order to produce such an interior lining, a heating layer is pre-laminated onto a carrier to form a carrier/layer composite, and an upper layer is press-laminated, membrane-laminated or vacuum-laminated onto the carrier/layer composite.

11 Claims, 4 Drawing Sheets

(56) References Cited

U.S. PATENT DOCUMENTS

| | | | |
|---|---|---|---|
| 5,925,275 A * | 7/1999 | Lawson et al. | 219/543 |
| 6,084,206 A * | 7/2000 | Williamson et al. | 219/212 |
| 6,087,630 A * | 7/2000 | Miller et al. | 219/213 |
| 6,222,160 B1 * | 4/2001 | Remke et al. | 219/387 |
| 6,611,659 B2 * | 8/2003 | Meisiek | 392/435 |
| 7,244,914 B2 * | 7/2007 | Yoneyama et al. | 219/545 |
| 7,804,044 B2 * | 9/2010 | Diemer et al. | 219/217 |
| 2002/0003136 A1 * | 1/2002 | Williamson et al. | 219/212 |
| 2007/0210073 A1 * | 9/2007 | Hubert et al. | 219/535 |
| 2008/0210679 A1 * | 9/2008 | Raidt et al. | 219/213 |
| 2009/0218334 A1 * | 9/2009 | Wallace | 219/528 |
| 2010/0000981 A1 * | 1/2010 | Diemer et al. | 219/202 |
| 2010/0175824 A1 * | 7/2010 | Hopkins et al. | 156/249 |
| 2010/0176110 A1 * | 7/2010 | Ogino et al. | 219/202 |
| 2012/0234819 A1 * | 9/2012 | Berger | 219/213 |
| 2013/0186884 A1 * | 7/2013 | Barfuss et al. | 219/529 |

\* cited by examiner

INTERIOR LINING

CROSS-REFERENCE TO RELATED APPLICATIONS

This application is a US national stage filing under 35 USC §371 of International Patent Application No. PCT/EP2010/067242 filed on Nov. 10, 2010, and claims priority under the Paris Convention and 35 USC §119 to German Patent Application No. 10 2009 052 535.1 filed on Nov. 11, 2009.

FIELD OF THE DISCLOSURE

The invention relates to an interior lining for vehicles and aircraft, comprising a carrier, at least one heating layer and an upper layer, wherein the at least one heating layer is arranged between the carrier and the upper layer and at least the at least one heating layer and the upper layer are interconnected directly or indirectly. The invention further relates to a method for producing an interior lining of this type, wherein at least one heating layer is pre-laminated onto an upper layer to form a layer composite and the layer composite is press-laminated, membrane-laminated or vacuum-laminated onto a carrier, or alternatively, in order to produce an interior lining of this type, a heating layer is pre-laminated onto a carrier to form a carrier/layer composite and an upper layer is press-laminated, membrane-laminated or vacuum-laminated onto the carrier-layer composite.

BACKGROUND OF THE DISCLOSURE

The term "interior lining" includes all parts which can form the surfaces in the interior of a vehicle or aircraft. In the example of a motor vehicle, "interior linings" may include linings of the door, the dashboard, the pillars, the roof and the operator controls as well as arm-rests or the like, for example.

"Vehicles and aircraft" is understood to mean all means of transportation over water, on land, and in the air.

It is known from the prior art in the field of vehicles and aircraft to control the temperature of the interior by means of ventilating heaters and air-conditioning systems, wherein the waste heat of the internal combustion engine is usually utilised to heat the outside air. It is also known to heat individual objects with which the operator comes into direct contact. In modern vehicles, the seats and the steering wheel are for example optionally provided with heaters so as to warm the operator's bottom and upper leg areas as well as his hands.

A drawback of previous methods for heating vehicle interiors is that, in particular at low temperatures in winter, a considerable length of time passes before the engine releases sufficient heat to heat the vehicle interior by means of ventilation. In particular in the case of diesel vehicles, a very long period of time generally elapses before the air can be heated, and therefore additional electrical heating devices are already provided in the ventilation duct for this purpose. In vehicles not driven by means of an internal combustion engine, for example electric cars, it is not possible overall to use waste heat of the motor to heat the interior, since the electric motor does not generate sufficient heat.

The heaters installed previously in the region of the seats or steering wheel are merely suitable for heating specific body parts in contact therewith, but are unsuitable for heating the vehicle interior.

To pre-heat vehicles, auxiliary heaters are also used, in which heat is generated by means of combustion of fuel at a predeterminable time and is then also transported into the vehicle interior via the ventilation. A drawback of auxiliary heaters of this type is that, when fuel is combusted, malodorous waste gases which are harmful to health are produced. In particular, if auxiliary heaters are used in closed spaces, such as garages or underground car parks, the ambient air becomes highly contaminated within just a short space of time.

SUMMARY OF THE DISCLOSURE

The object of the invention is therefore to provide a heating device for the interior of vehicles and aircraft which heats the interior of the vehicles and aircraft very quickly independently of the heat output of engines.

The object is achieved by the features and a method according to the present disclosure.

An interior lining for vehicles and aircraft is provided which comprises a carrier, at least one heating layer and an upper layer, wherein the at least one heating layer is arranged between the carrier and the upper layer and at least the at least one heating layer and the upper layer are interconnected in a planar manner, at least in portions. In contrast to known heaters, such as a steering wheel heater in which a heating wire extends inside the steering wheel and heats the entire body of the steering wheel, or a seat heater in which a heating mat is placed on the seat frame before the upholstery is fastened to the frame, any interior lining can be converted into a heater using the design according to the invention.

The heating layer, together with the upper layer, forms a layer composite which is arranged on the carrier in such a way that the heating layer is arranged behind the upper layer and cannot be seen from the outside. The layer composite surrounds the carrier completely, at least over the surfaces pointing towards the interior. In an alternative embodiment, a plurality of heating layers can also be arranged one above the other and form a layer composite together with the upper layer.

In a preferred embodiment, the heating layer is laminated onto the upper layer so that a planar connection is formed. The use of a natural material as the upper layer, in particular leather or textile, is particularly advantageous so as to guide the heat released from the heating layer towards the outside as effectively as possible and, at the same time, to ensure a pleasant appearance and easy workability. With the use of leather it is also advantageous that the starting material can be cut to size in accordance with the forms of the interior lining and that any seams can be formed at the connection points and edges of the individual parts. In a preferred embodiment, the heating layer is arranged in the surface regions between the seams of the upper layer. For alternative applications with reduced requirements for surface quality, a film or artificial leather can also be used instead of leather.

It is also preferred if the heating layer is formed as a non-woven fabric through which at least one heating means is passed. The use of a non-woven fabric, in particular a fibrous non-woven fabric, is advantageous since it is particularly suitable for laminating onto leather for example and has many gaps into which the heating means can be easily introduced. It is also advantageous if, when using a non-woven fabric as a heating layer, the layer composite formed of heating layer and upper layer remains thin, flexible and therefore easy to work. Such a layer composite can be applied to any surfaces of lining parts in the vehicle interior, and therefore the effective output of the heater and therefore the heating area provided in the vehicle can also be influenced via the number of parts provided with a heating layer.

In an advantageous embodiment the heating layer of the finished interior lining has a thickness of 0.2 mm to 2 mm, preferably 0.3 to 0.8 mm, most preferably 0.5 mm. With such a thin heating layer, it is advantageous if the layer composite is also very thin and can be applied to any interior parts without the dimensioning of the interior lining parts having to be additionally adapted. For example, it is therefore also possible to retrofit existing lining parts to form an interior lining according to the invention.

It is preferable to use as a heating means a cylindrical or planar heating wire which extends inside the heating layer substantially over the entire surface thereof in the form of a two-dimensional or three-dimensional pattern. In a preferred embodiment, the heating wire is made of copper and extends in a meandering manner inside a heating layer formed of non-woven fabric so as to therefore ensure a homogeneous distribution of heat within the heating layer, said heat being released uniformly to the upper layer. The heating means thus formed has a thickness from 0.1 to 0.5 mm, preferably 0.2 mm, and can extend within the non-woven fabric at a plurality of levels. The heating capacity is thus increased considerably.

The heating layer is preferably formed so as to absorb the heat released by the heating means and to irradiate it substantially over the entire surface of the heating layer. An intermediate layer can be provided between the heating layer and the carrier so as to boost the thermal radiation, said intermediate layer reflecting the thermal radiation in such a way that minimal heat is transferred to the carrier itself and a maximum degree of the released heat is irradiated into the interior of the vehicle.

In a possible alternative embodiment, the intermediate layer can be formed as a foam layer and the heating layer can be accommodated in the foam layer. In a preferred embodiment of this type, the heating layer is accommodated in the foam layer so as to be surrounded substantially completely by foam.

In contrast to the known heating devices in vehicles, in the present invention the interior lining itself is formed as a space heater and transfers the heat to the passengers and to the ambient air by means of thermal radiation. In contrast to conventional heaters, the heating effect can be noticed at the interior lining and on the skin just a few moments, for example one minute, after switching on the space heater. The thermal radiation acts not only on the passengers, but also on the vehicle parts, for example the windscreen and side windows, whereby positive effects such as the de-icing or de-misting of the windscreen and windows are made possible. This is possible in particular if the interior lining according to the invention is installed in the dashboard region or in the region below the windows and the heat is radiated directly onto the windscreen and windows or rises upwardly towards the windscreen and windows.

It is also advantageous that the carrier of the invention can be formed by the base of any interior part of a vehicle. All interior parts can therefore be considered as carriers, but in particular the decorative parts on the dashboard and the doors and storage compartments and resting surfaces arranged in the central region. The carrier parts are preferably made of plastics material. The layer composite formed of heating layer and upper layer is laminated onto the carrier, for example by vacuum-lamination, press-lamination or membrane-lamination, so that the layer composite basically adopts the outer form of the carrier.

In a preferred embodiment, the upper layer is perforated so as to increase the heating capacity and the released thermal radiation. In particular with the use of leather, perforation is advantageous so as to give the material freedom of movement during heating and to assist the passage of heat.

To monitor the heating capacity, a temperature sensor can be provided in the region of the heating layer and sends a signal back to the heating control and thus makes it possible to adjust a predefined temperature. Temperatures of 60° C. are preferably produced in the region of the heating layer, wherein the surface temperature on the side of the upper layer facing the interior is preferably 40° C. in the heated state.

The vehicles and aircraft comprising an interior lining according to the invention are also included within the scope of protection of the present invention. The invention also relates to the provision of a method which includes the steps of pre-laminating a heating layer onto an upper layer to form a layer composite and press-laminating the layer composite onto a carrier. An interior lining part which can replace a conventional part and which can provide a rapid heating effect independently of other heat sources is thus produced in an economical manner.

With use of leather as the upper layer, different individual parts can be sewn together in accordance with the outer shape of the lining part, then a non-woven fabric layer comprising heating means can preferably be laminated into the surface portion next to the seams so as to then laminate this layer composite onto a carrier part by the aforementioned method in such a way that a component of known visual appearance is produced, which can however act as an interior heater. The heating layer is no longer visible from the outside once the method according to the invention has been carried out.

Alternatively, the heating layer can also first be pre-laminated onto the carrier to form a carrier/layer composite, and the upper layer can then be press-laminated, membrane-laminated or vacuum-laminated onto the carrier/layer composite. In embodiments in which a foam layer is used, the heating layer can be arranged, surrounded by foam, between the upper layer and the carrier, and the parts can be press-laminated, membrane-laminated or vacuum-laminated together. The component produced by this method has the same advantageous above-described effects.

The above-described preferred device subject-matters, for example as a heating layer a non-woven fabric through which a copper wire is passed, are preferably used for the method.

BRIEF DESCRIPTION OF THE DRAWINGS

Further features, advantages and variants of the invention will be discussed in the following description of the drawings of exemplary embodiments, in which.

DETAILED DESCRIPTION OF THE DISCLOSURE

Figure 1:
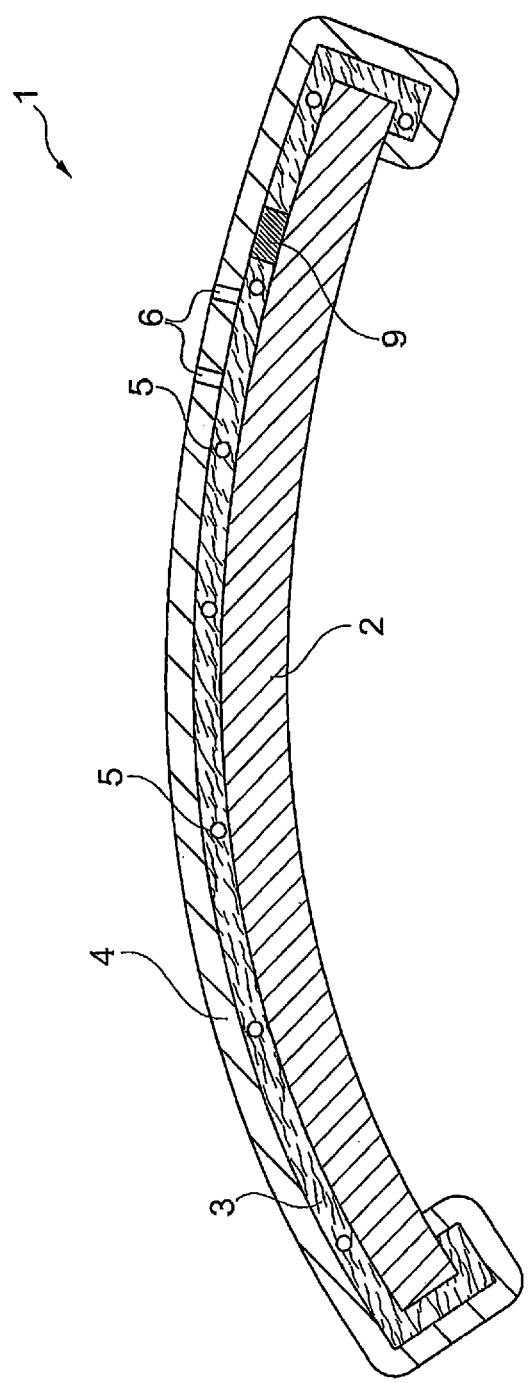
FIG. 1 is a sectional view of an interior lining according to the present invention.

FIG. 1 is a schematic sectional view of an interior lining 1 in the example of a decorative part in the finished state. The heating layer 3 formed as a non-woven fabric is connected to the upper layer 4 formed of leather to form a layer composite, wherein the connection is formed by lamination of the heating layer onto the upper layer 4. A heating wire 5 extends inside the heating layer 3 and extends substantially over the entire surface area of the carrier 2 formed as a decorative part of a door lining. The layer composite formed of the heating layer 3 and upper layer 4 is press-laminated onto the carrier 2, wherein the heating layer preferably has a thickness of 0.3 to 0.8 mm in the end state. The heating wire 5 has electrical connections (not shown) so as to supply the energy required for heating.

The upper layer has a perforation 6, illustrated by way of example, so as to accelerate the passage of heat to the vehicle interior. The heat produced at the heating wire 5 is distributed homogeneously over the heating layer so as to ensure uniform thermal irradiation. The heating layer 3 is preferably formed of a fibrous non-woven fabric, wherein the fibres are designed to distribute the heat quickly within the heating layer and to thus ensure planar thermal radiation. A temperature sensor 9 is provided in the region of the heating layer 3 and measures the temperature of the interior lining part 1.

Figure 2:
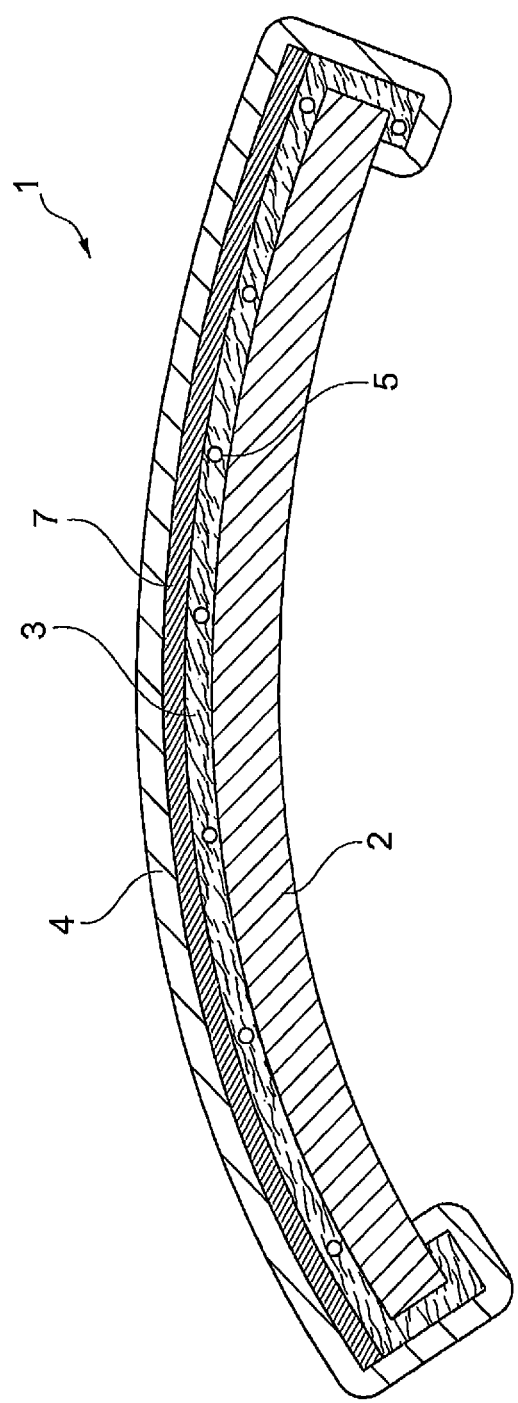
FIG. 2 is a sectional view of an interior lining according to an alternative embodiment of the present invention.

FIG. 2 is a schematic sectional view of an interior lining 1 according to FIG. 1, wherein a composite layer 7 is additionally arranged between the upper layer 4 and the carrier 2 and indirectly connects the heating layer 3 to the upper layer. In the example shown, the composite layer 7 is formed as a knitted fabric, but non-woven fabrics or foam can also be used. The composite layer 7 stabilises the upper layer 4 and makes it possible to form a stable structure on the carrier 2. The embodiment is otherwise identical to that of FIG. 1.

Figure 3:
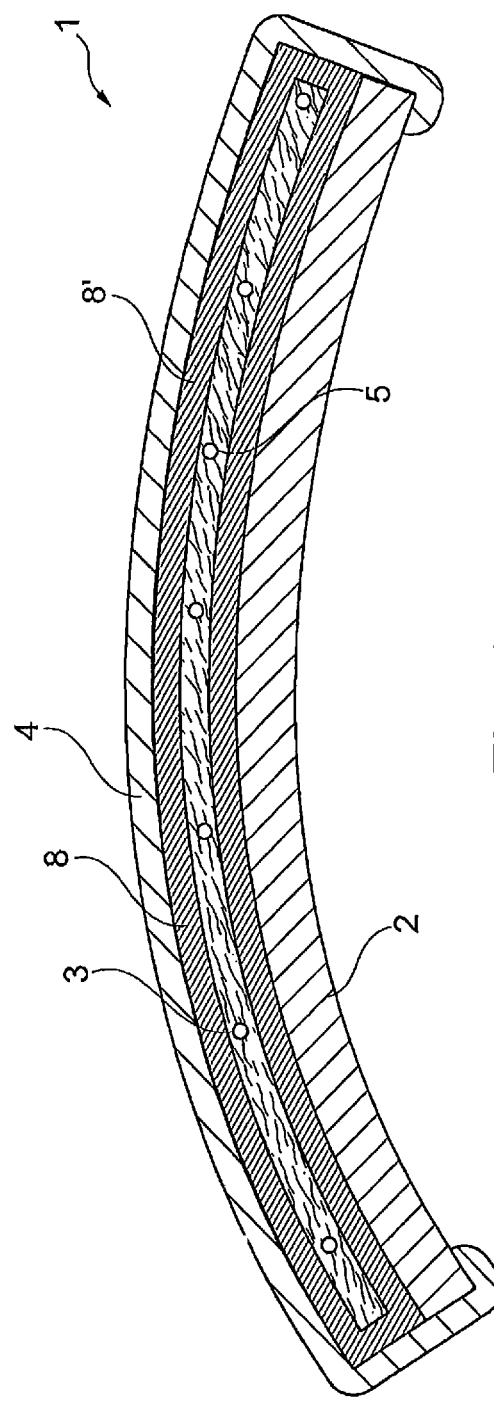
FIG. 3 is a sectional view of an interior lining according to a further alternative embodiment of the present invention.

FIG. 3 is also a schematic sectional view of an interior lining 1 according to FIG. 1. The heating layer 3 forms a type of core and is embedded in an intermediate layer formed as a foam layer 8' or is surrounded by the foam layer 8. The foam layer 8 surrounds the heating layer 3 completely and thus acts in a stabilising manner on the two sides. The foam layer 8 also stores the heat and releases it uniformly, even once the heater has been switched off. It is possible to dispense with a composite layer 7 due to the use of the foam layer 8 according to FIG. 3.

Figure 4:
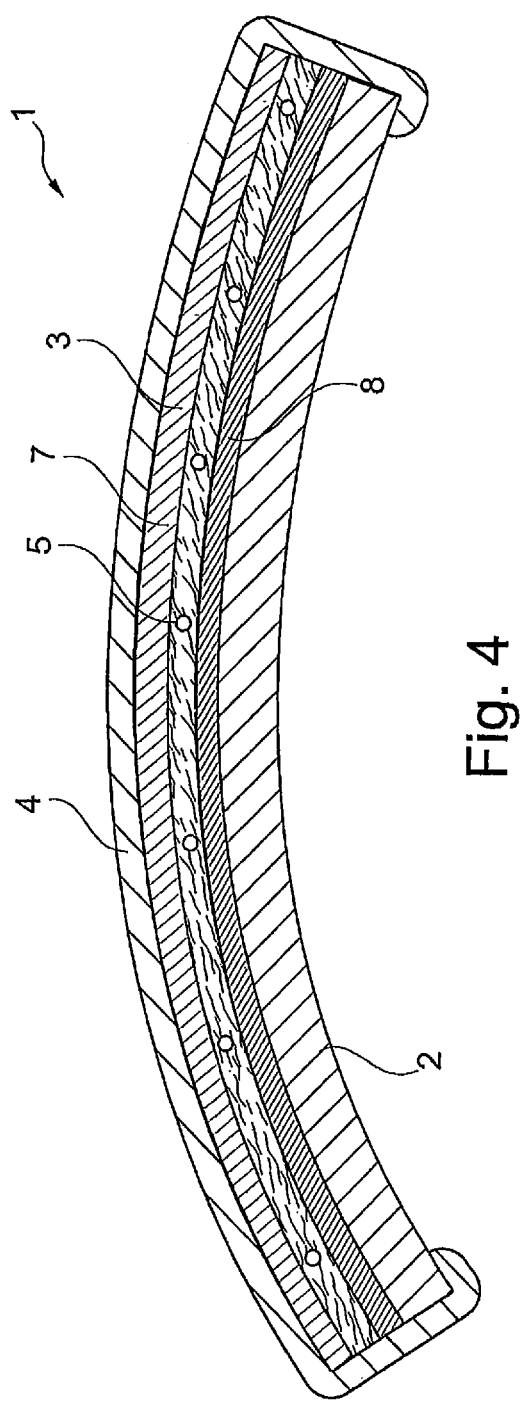
FIG. 4 is a sectional view of an interior lining according to a further alternative embodiment of the present invention.

FIG. 4 shows a further embodiment of an interior lining 1 according to FIG. 1, in which an intermediate layer 8 and a composite layer 7 are additionally provided between the upper layer 4 and the carrier 2. The composite layer 7 is inserted between the heating layer 3 and the upper layer 7 and provides the upper layer 4 with a homogeneous outer surface. An intermediate layer 8 is introduced between the carrier 2 and the heating layer 3 and reflects the thermal radiation of the heating layer 3 in the direction of the upper layer 4. In order to increase the reflection, the foam comprises means for reflection which are formed as aluminium components for example. At the same time, the intermediate layer 8 ensures a uniform surface on the carrier 2. The carrier 2 can be pre-laminated beforehand to the intermediate layer 7, before the further layers are laminated by the above-described method.

For all embodiments, the layers 2, 4, 7 and 8 can also each extend over the entire surface of the interior lining part 1. The upper layer 4 can have seams due to the preferred use of natural materials, different layer parts being connected to said seams. In order to fasten the layers to the carrier 2, said layers can extend as far as the underside of the carrier 2 and be fixed there, for example by adhesives, seams or clips.

The invention is not limited in terms of its design to the preferred exemplary embodiments described above. Rather, a number of variants are conceivable which make use of the illustrated solution, even in the case of embodiments which are basically different. For example, a plurality of heating layers can be arranged one above the other and the heating wires can be distributed in the layers in such a way that heat is distributed substantially over the entire surface. Lining parts constructed equivalently are included within the scope of protection of the invention. For example, an additional composite layer can be provided in spite of the fact that the heating layer is surrounded completely by foam.

The invention claimed is:

1. An interior lining for vehicles, comprising:
   a carrier made of plastic material formed by a base of decorative parts on the dashboard or the door or the storage compartments,
   at least one heating layer, and
   an upper layer,
   wherein the at least one heating layer is laminated onto the upper layer and the at least one heating layer and the upper layer form a layer composite which is membrane-laminated, vacuum laminated or press-laminated onto the carrier,
   wherein the layer composite adopts the outer form of the carrier,
   wherein the at least one heating layer is arranged between the carrier and upper layer and the at least one heating layer and the upper layer are interconnected indirectly,
   wherein a composite layer is arranged between the upper layer and the heating layer and connects the heating layer indirectly to the upper layer,
   the at least one heating layer is formed as a fibrous non-woven fabric through which at least one heating means is passed,
   the at least one heating layer having a thickness of 0.3 mm to 0.8 mm, and
   wherein at least said upper layer extends as far as an underside of the carrier and is fixed there.

2. The interior lining according to claim 1, wherein the at least one heating layer is pre-laminated onto the carrier.

3. The interior lining according to claim 1, wherein the composite layer is formed as a knitted fabric, non-woven fabric or foam.

4. The interior lining according to claim 1, wherein the at least one heating means is a cylindrical or planar heating wire which extends inside the heating layer substantially over the entire surface of the heating layer in the form of a two-dimensional or three-dimensional pattern.

5. The interior lining according to claim 1, wherein the heating layer is designed to absorb the released heat of the heating wire and to irradiate it substantially over the entire surface.

6. The interior lining according to claim 1, wherein the upper layer is a natural leather or textile material which can be laminated onto the heating layer.

7. The interior lining according to claim 1, wherein the upper layer is perforated.

8. The interior lining according to claim 1, wherein an intermediate layer is provided between the heating layer and the carrier and reflects the thermal radiation.

9. The interior lining according to claim 1 wherein at least one temperature sensor is provided in the region of the heating layer.

10. The interior lining according to claim 1, wherein the interior lining is formed as a space heater and the heating effect is achieved by means of thermal radiation.

11. A vehicle which comprises an interior lining according to claim 1.

* * * * *